Patented Mar. 15, 1938

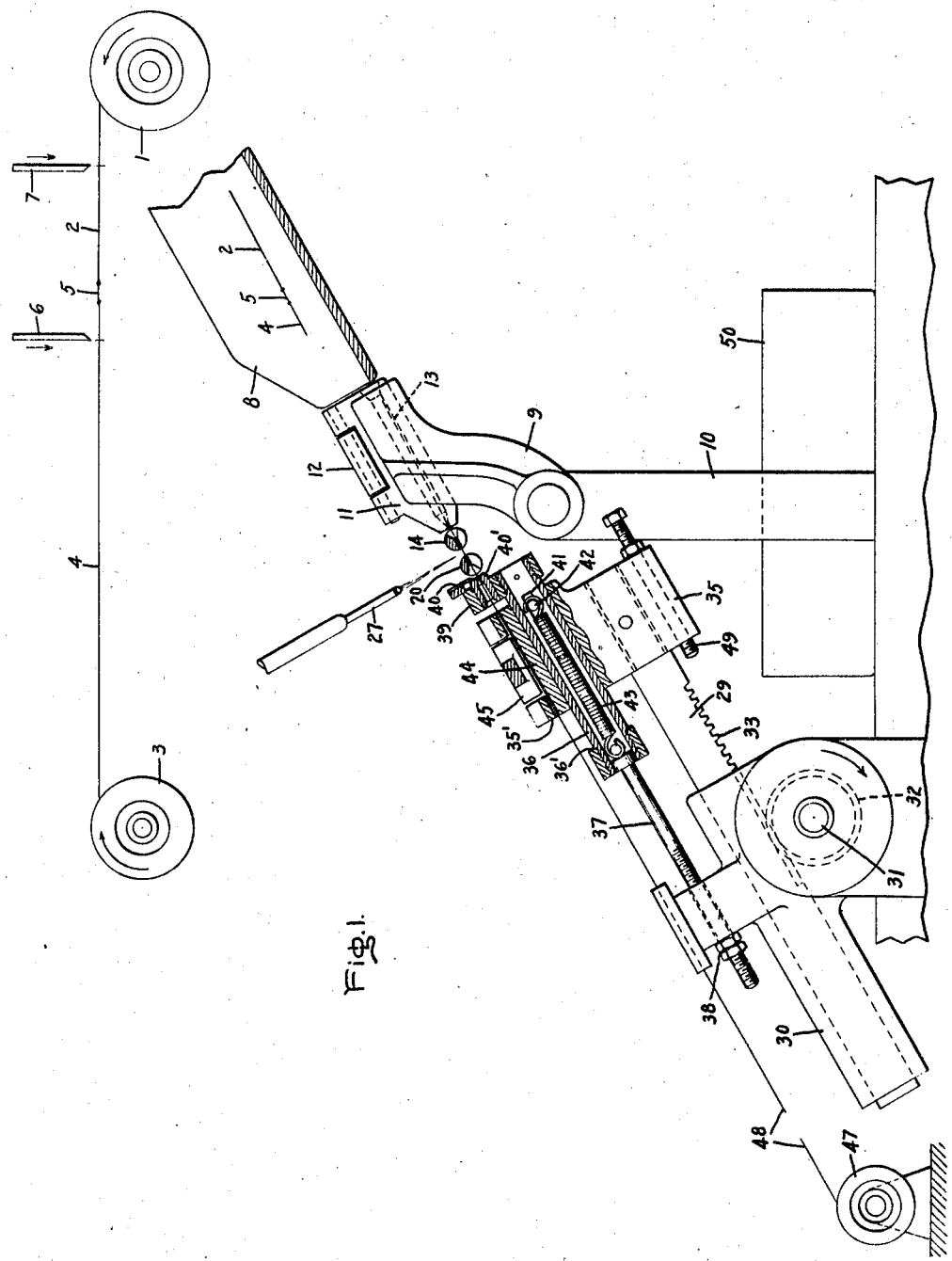

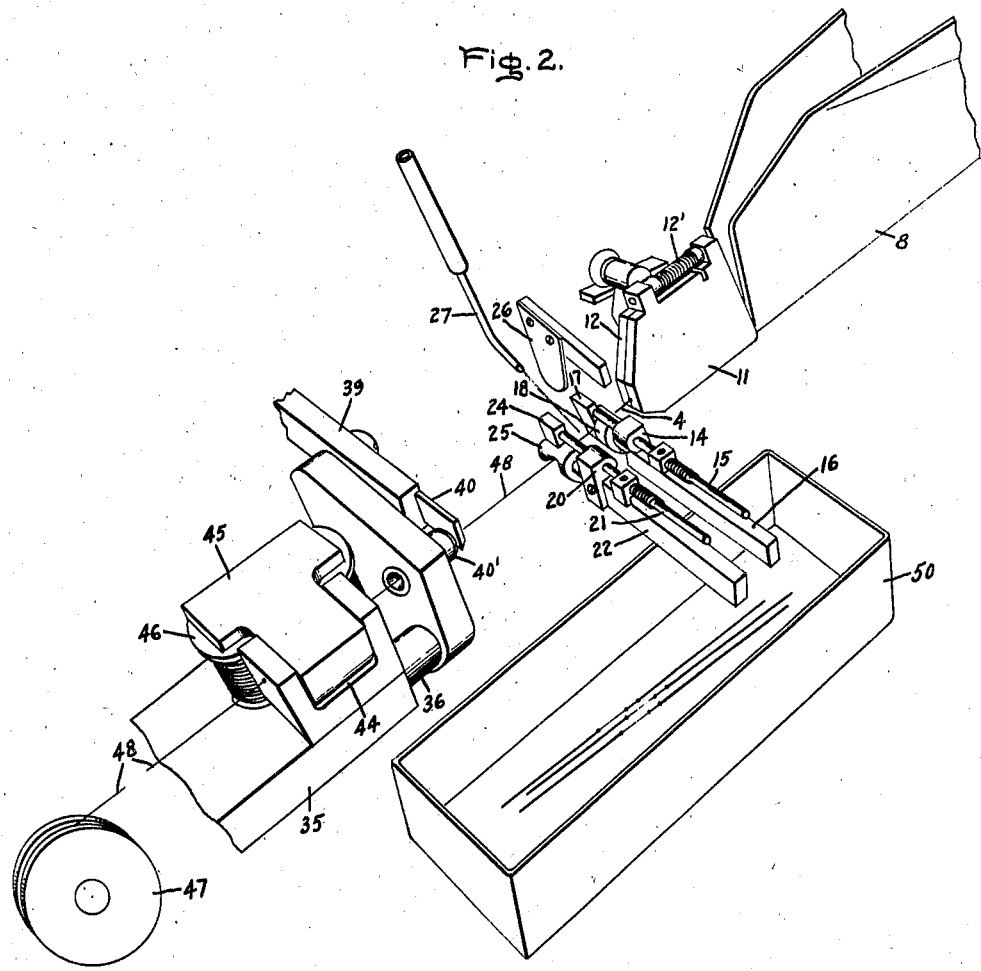

2,111,426

UNITED STATES PATENT OFFICE 2,111,426

METHOD AND APPARATUS FOR WELDING WIRES

Wilhelm Hilbert, Berlin-Lichtenberg, Germany, assignor to General Electric Company, a corporation of New York Application May 10, 1937, Serial No. 141,808
In Germany May 22, 1936

4 Claims. (Cl. 140—112)

My invention relates to a method and apparatus for welding wires and more particularly for welding wires to form the leading-in conductors for electric incandescent lamps and similar devices.

In the manufacture of electric incandescent lamps and particularly those with double-coiled filaments, four-part leading-in wires are frequently required which consist of an inner lead wire which reaches from the filament to the stem tube, a press lead which is sealed into the press portion of the stem tube, a fuse wire which melts through in the case of a filament short circuit, and an outer lead wire which provides the electrical connection to the base.

The production of such four-part lead wires necessitates the preparation of specially designed machines wherever the individual parts are to be successively welded together or wherever the two central wire parts are to be welded simultaneously between the two end parts. One of the objects of my invention is to make such four-part lead wires on the machines which produce three-part lead wires and which are generally utilized in the lamp industry, adapting them to this purpose by means of a simple extension that can be provided readily. This object can be realized according to the invention when first, in the manner which is customary in the production of three-part lead wires, the press lead part is welded between the inner lead part and the fuse lead part, whereupon this three-part lead wire is temporarily made to drop on an inclined trough and made to slide against a stop plate, while the outer lead wire is moved against the same stop plate from the opposite side so that it forms an axial extension of the three-part lead wire. After the wire elements have been placed against each other in this automatic manner, the welding together of these parts can readily be effected by moving the parts closer together after the stop plate has been removed and the ends of the wire parts have been heated. In certain cases, it is possible to follow this welding process with a process in which the fuse lead part is covered with a protective glass layer or a glass jacket. It is to advantage to cause the finished four-part lead wire to drop into a storage container after the welding of the outer lead part to the fuse lead part. This may be effected by opening the inclined trough or by opening a guide which constitutes a continuation of the trough. Other features and advantages of my invention will appear from the following detailed description.

In the drawings, Fig. 1 is an elevation, partly in section and partly diagrammatic of apparatus comprising my invention; and Fig. 2 is a perspective view of a portion thereof.

The production of the four-part lead wire according to the new method takes place on a known machine for the manufacture of three-part lead wires. As shown schematically in Fig. 1, the inner lead wire 2, which is located on a storage spool 1, is withdrawn to the left in the direction of the arrow, while the fuse wire 4, located on a storage spool 3, is withdrawn in the direction of the arrow to the right. These wires, disposed in axial alignment, are then moved toward each other. In a known manner, a short press lead part 5 of a suitable size, which serves for sealing the lead wire in the press portion of the stem tube, is put in place by means of pliers between the ends of the wires which are moved toward each other. This wire 5 is then welded between those two parts, whereupon the two wires 2, 4 can be cut to the proper length by means of the knife blades 6, 7. In this manner, a three-part lead wire is first obtained which, after the cutting, drops temporarily in an inclined trough 8. At the lower end of the trough 8, a two-part flap guide is attached, which is fastened by means of an arm 9 to the machine frame 10. This guide consists of two jaws 11, 12 which are linked together at their upper edges and which are held against each other by means of a torsion spring 12'. The jaws 11, 12 of this guide are provided with opposed grooves of semi-circular cross section so that a cylindrical guiding channel 13 is formed when the jaws are closed. Close to the front end of the guide 11, 12, a supporting clamp 14 (Fig. 2) is provided, whose parallel leg rods 15, 16 carry at their front ends the jaws 17 and 18 which are closed when the upper rod 15 is moved in a longitudinal direction. Alongside the clamp 14 is disposed a second holding clamp 20 designed in a similar manner, whose parallel rods 21, 22 carry the jaws 24, 25 at the front ends. Between the holding clamps 14 and 20 there is provided a stop plate 26 which can be raised and lowered. Furthermore, there is arranged in the vicinity of these holding clamps 14, 20 a burner 27 which is preferably controlled as a function of the actuation of the stop plate 26.

For the purpose of leading the fourth wire part, that is, the outer lead part, to the three-part wire, a slide 29 is provided, which has the same inclination as the trough 8 and the guide 13 and which rests in a bearing block 30 so that it can be displaced. A gear 32 is fastened in the bearing block 30 on a shaft 31 and meshes with the teeth 33 on the slide 29. The reciprocating motion of the element 29 is obtained by means of the gear 32 and the rack teeth 33. The end of the slide 29 which faces the guide 13 carries a head 35. In this head, a sleeve 36 is inserted, so that it can be displaced, while the sleeve carries at its rear end a rod 37 provided with a stop nut 38, and at its front end it carries a blade arrangement 39. The sleeve 36 is provided with two longitudinal slots 41 through which a bolt 42 of the head 35 penetrates. A tension spring 43 acts on the bolt 42 and is fastened at its other end to the sleeve 36. The head 35 further carries a plate 45 which can be clamped on and which is preferably pressed against the base 44 by means of an electric magnet 46. In the machine frame, the storage coil 47 for the outer lead wire 48 is arranged close to the bearing block 30. The head 35 further carries an adjustable stop pin 49.

The three-part lead wire, produced in the known manner, drops, after having been cut off by the blades 6 and 7, into the trough 8. As a result of its weight, it will slide downward and will enter the guiding canal 13 of the flap guide 11, 12, until its front end strikes the plate 26. At that point, the holding clamp 14 is closed by means that have not been shown, by a slight backward motion of the upper rod 15, so that the front end of the three-part lead wire is clamped close to the stop plate 26. At the same time, the outer lead wire 48 is fed from the opposite side to the stop plate 26. This is carried out by means of a rotation of the gear 32 in the indicated direction, as a result of which the slide 29 is moved toward the stop plate 26. The outer lead wire 48, which is grasped, by means of the clamping plate 45, by the slide head 35, is then taken along and is fed with its front end through the opened clamp 20 against the stop plate 26. This is followed by a lifting of the plate 26, so that the ends of the wires that are to be welded will be located opposite each other at a small distance from each other. After the heating of these wire ends, which then takes place by means of the burner 27 which has been placed in position in the meantime, the end of the outer lead wire 48 is then welded to the end of the three-part lead wire which is located opposite thereto. This welding results from the fact that the holding clamp 20, together with the outer lead wire which it holds, is moved slightly toward the other holding clamp 14 and, consequently, against the end of the fuse wire 4. The two wire ends which have been heated to the glowing temperature are then pressed against each other and welded together. After the welding of the two wire ends, the slide 29 moves back. The clamping plate 45 has already been released before the slight motion of the holding clamp 20 by its electric magnet 46 and has released the outer lead wire 48. The head 35 moves backward when the clamping plate 45 is loosened, while the outer lead wire 48 does not participate in this return motion. As a result of the action of the tension spring 43, the sleeve 36 also at first does not participate in the return motion of the head; it participates only when the rear surface 35' of the head 35 strikes the end 36' of the sleeve 36. In this manner, a short piece of outer lead wire 48 is placed between the knife arrangement 39 and the head 35. The sleeve 36 and the knife arrangement then participate in the further return motion of the head 35 so that, between the holding clamp 20 and the knife arrangement 39, a free piece of wire of the outer lead wire 48 remains. When the adjusting pin 49 of the head 35 strikes the bearing block 30 the head 35 has reached its lowest position. In this position the knife arrangement will sever the wire due to the actuation of the knife 40 which slides past the wire die 40' which serves as the counter-blade, thereby severing the outer lead wire 48 so that the end part which is welded to the three-part lead is cut off. Briefly, before the wire is severed, the electric magnet 46 again comes into action, as a result of which the clamping plate 45 is pressed against the base 44 of the head 35; that is, the outer lead wire 48 is grasped again. During the subsequent advancing motion of the slide 29, the end of the outer lead wire 48 is again led to the stop plate 26 in the manner described above. The finished four-part lead wire, which is located in the flap guide 11, 12, drops in a container 50 located under this flap when the latter is opened.

It is to advantage to provide means, either on the machine or separate from the machine, for providing the fuse wire 4 of the four-part lead wire with a glass coating. This covering may, for instance, consist of a small glass tube which is placed over the fuse wire part and which is sealed to the end of that wire part at its ends.

What I claim as new and desire to secure by Letters Patent of the United States is:

1. The method of manufacturing a four-part lead wire for electric incandescent lamps and similar devices which comprises welding ends of a fuse lead and an outer lead to opposite ends of a press lead in axial alignment therewith to form a three-part lead wire, dropping said three-part lead wire in an inclined trough down which it slides with the end of the fuse lead foremost against a stop plate, advancing an outer lead wire toward said three-part wire in axial alignment therewith from the opposite side of said stop plate to cause the end thereof to abut against said plate, removing said plate from its position between the ends of said three-part wire and said outer lead wire and then heating the said adjacent ends of said three-part wire and said outer lead wire and moving said ends toward each other to weld them together.

2. In a device of the type described, the combination of an inclined trough adapted to receive a wire therein which slides toward the lower end thereof, a stop plate constructed and arranged to move into and out of the path of said wire whereby the end of said wire is caused to abut against said stop plate when it is in the path of said wire, means disposed at the opposite side of said stop plate for advancing another wire in axial alignment with said first-mentioned wire to cause the end of said wire to abut against the said opposite side of said stop plate, a pair of clamping jaws mounted on opposite sides of said stop plate and constructed and arranged to grip each of said wires and to move relatively toward each other when said stop plate is away from its position between said wires, and means for heating the adjacent ends of said wires to cause them to be welded together.

3. In a device of the type described, the combination of an inclined trough adapted to receive a wire therein which slides toward the lower end thereof, a guide member located adjacent to the lower end of said trough and comprising a pair of jaws having opposed grooves therein in alignment with the bottom of said trough and adapted to receive the wire as it slides from said trough, a stop plate constructed and arranged to move into and out of the path of said wire whereby the end of said wire is caused to abut against said stop plate when it is in the path of said wire, means disposed at the opposite side of said stop plate for advancing another wire in axial alignment with said first-mentioned wire to cause the end of said wire to abut against the said opposite side of said stop plate, a pair of clamping jaws mounted on opposite sides of said stop plate and constructed and arranged to grip each of said wires and to move relatively toward each other when said stop plate is away from its position between said wires, and means for heating the adjacent ends of said wires to cause them to be welded together, said guide jaws being constructed and arranged to separate and thereby release the portion of the wire therein.

4. Apparatus for welding wires for incandescent lamps and similar devices comprising in combination with means for welding ends of a fuse lead and an outer lead to opposite ends of a press lead in axial alignment therewith to form a three-part wire, an inclined trough disposed below said means for receiving the said three-part wire when it is released from said welding means, said wire sliding toward the lower end of said trough with the end of the fuse lead portion foremost, a stop plate constructed and arranged to move into and out of the path of said wire whereby the end of said wire is caused to abut against said stop plate when it is in the path of said wire, means disposed at the opposite side of said stop plate for advancing another wire in axial alignment with said first-mentioned wire to cause the end of said wire to abut against the said opposite side of said stop plate, a pair of clamping jaws mounted on opposite sides of said stop plate and constructed and arranged to grip each of said wires and to move relatively toward each other when said stop plate is away from its position between said wires, and means for heating the adjacent ends of said wires to cause them to be welded together.

WILHELM HILBERT.